(12) United States Patent
Sakamoto et al.

(10) Patent No.: US 8,799,536 B2
(45) Date of Patent: Aug. 5, 2014

(54) DATA PROCESSING APPARATUS, DATA PROCESSING METHOD AND COMPUTER-READABLE MEDIUM

(75) Inventors: Isao Sakamoto, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 12/821,964

(22) Filed: Jun. 23, 2010

(65) Prior Publication Data

US 2010/0329261 A1  Dec. 30, 2010

(30) Foreign Application Priority Data

Jun. 29, 2009  (JP) ................................ 2009-153314

(51) Int. Cl.
*G06F 13/38* (2006.01)
*G06F 3/00* (2006.01)

(52) U.S. Cl.
CPC ...................................... *G06F 13/38* (2013.01)
USPC ............ 710/52; 710/2; 710/5; 710/8; 710/11; 710/15

(58) Field of Classification Search
None
See application file for complete search history.

(56) References Cited

U.S. PATENT DOCUMENTS

| 5,155,858 | A | 10/1992 | DeBruler |
| 6,934,250 | B1 * | 8/2005 | Kejriwal et al. ............... 370/229 |
| 2002/0015413 | A1 | 2/2002 | Kaganoi |
| 2003/0204636 | A1 | 10/2003 | Greenblat |
| 2005/0129036 | A1 * | 6/2005 | Sawabe .......................... 370/401 |
| 2005/0138324 | A1 | 6/2005 | Tannhof |
| 2009/0323532 | A1 * | 12/2009 | Lai ................................ 370/235 |

FOREIGN PATENT DOCUMENTS

| EP | 1267271 A2 | 12/2002 |
| JP | 11-167560 A | 6/1999 |
| JP | 2007-316699 A | 12/2007 |

\* cited by examiner

*Primary Examiner* — Scott Sun
(74) *Attorney, Agent, or Firm* — Canon USA, Inc. IP Division

(57) ABSTRACT

An apparatus, in which a plurality of modules is connected with each other and processes a packet having information, includes a storage unit for storing first information indicating an order of processing performed by its own module and second information indicating an order of modules which perform processing, a reception unit for receiving a first packet and transmitting the first packet including information corresponding to the first information, a processing unit for processing data included in the first packet, a generation unit for generating a second packet including the processed data and the second information, and a transmission unit for comparing the information included in the first packet with the second information included in the second packet, and transmitting the packet having a latter processing order.

41 Claims, 8 Drawing Sheets

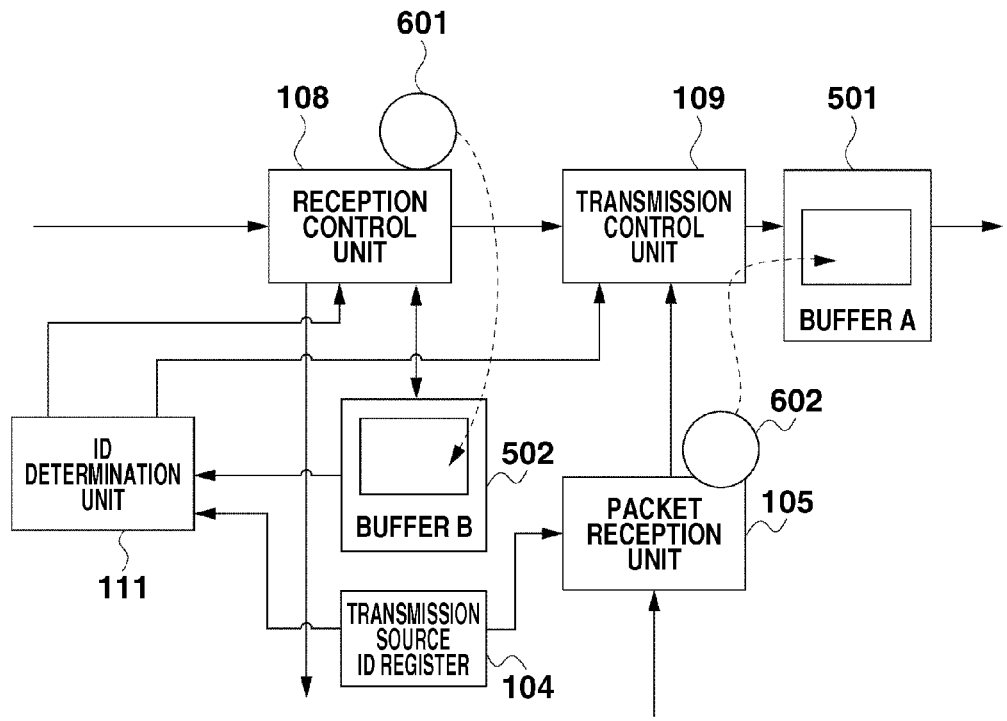
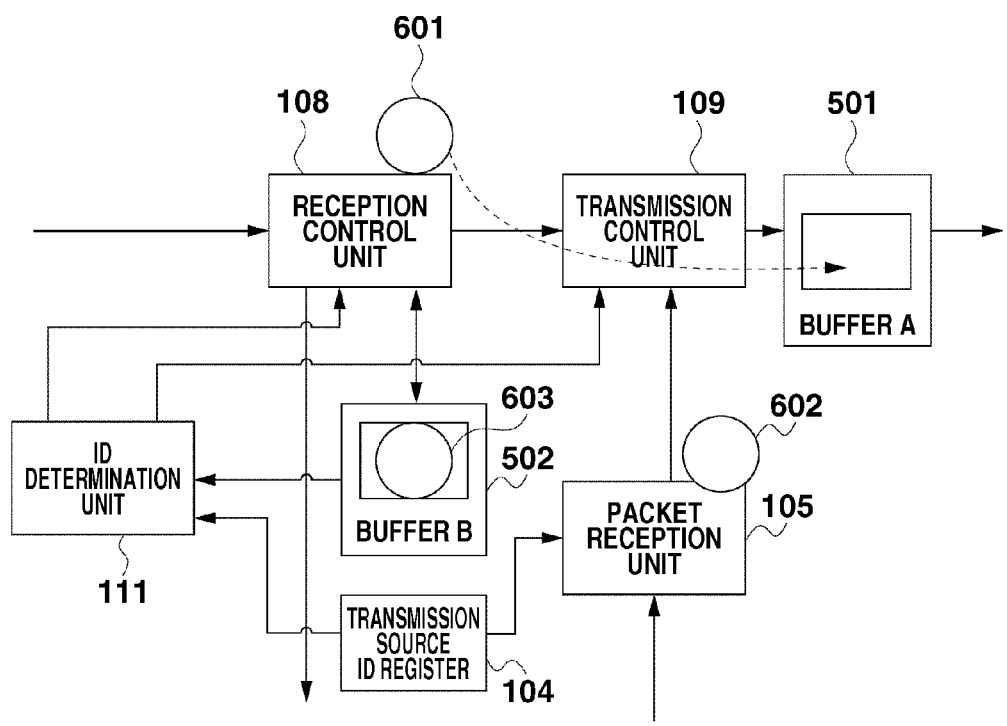

DATA PROCESSING APPARATUS, DATA PROCESSING METHOD AND COMPUTER-READABLE MEDIUM

BACKGROUND OF THE INVENTION

1. Field of the Invention

The present invention relates to a structure and a control method of a data processing apparatus, for efficiently transmitting a packet according to a using order of the modules, and a computer-readable storage medium.

2. Description of the Related Art

A data processing apparatus in which a plurality of modules is communicably connected with each other and performs parallel processing can realize efficient data processing in each module by transferring a packet according to its priority.

Japanese Patent Application Laid-Open No. 11-167560 discusses a data processing apparatus, in which a plurality of modules including buffers or memories having one or more stages is connected with each other in a ring shape to form a ring bus, the same number of packets as the number of the modules are arranged in the ring bus, and data processing is performed while the packets arranged between the modules are transferred in parallel. In Japanese Patent Application Laid-Open No. 11-167560, transfer according to the priority can be realized by determining the priority by collective management.

Japanese Patent Application Laid-Open No. 2007-316699 discusses a method for transferring packets according to the priority arranged for each module. More specifically, two ring buses, namely a data transfer bus and a response transfer bus connect the modules. When it is determined that the packet that has been already transferred to the ring bus has the lower priority than the packet to be transmitted by the module, the packet that has been already transferred to the ring bus is discarded. Then, the packet having the higher priority of transmission is transmitted to the ring bus. Since the currently transferred packet is discarded, a module notifies another module of discard of the packet using the response transfer bus. The other module notified the discard of the packet transmits another packet to a transmission source. As described above, the transfer of the packet according to the priority has been realized.

According to the method discussed in Japanese Patent Application No. 11-167560, when the data transfer according to the priority is realized by the collective management, a control circuit becomes complicated and a size thereof is increased in proportion to increase in the number of the modules.

According to the method discussed in Japanese Patent Application Laid-Open No. 2007-316699, until the module can determine that the packet transmitted thereby is not discarded by other modules, all the modules are to copy all packets transmitted thereby and stores the copied packets therein. Therefore, a capacity of a buffer for storing the copies of the transmitted packets is remarkably increased in proportion to the increase in the number of the modules.

SUMMARY OF THE INVENTION

According to an aspect of the present invention, an apparatus in which a plurality of modules is connected with each other and processes a packet having information includes a storage unit configured to store first information indicating an order of processing performed by its own module and second information indicating an order of modules which perform processing, a reception unit configured to receive a first packet and transmit the first packet including information corresponding to the first information, a processing unit configured to process data included in the first packet, a generation unit configured to generate a second packet including the processed data and the second information, and a transmission unit configured to compare the information included in the first packet with the second information included in the second packet, and transmits the packet having a latter processing order.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B illustrate an operation for changing packets.

DESCRIPTION OF THE EMBODIMENTS

Various exemplary embodiments, features, and aspects of the invention will be described in detail below with reference to the drawings.

Figure 1A:
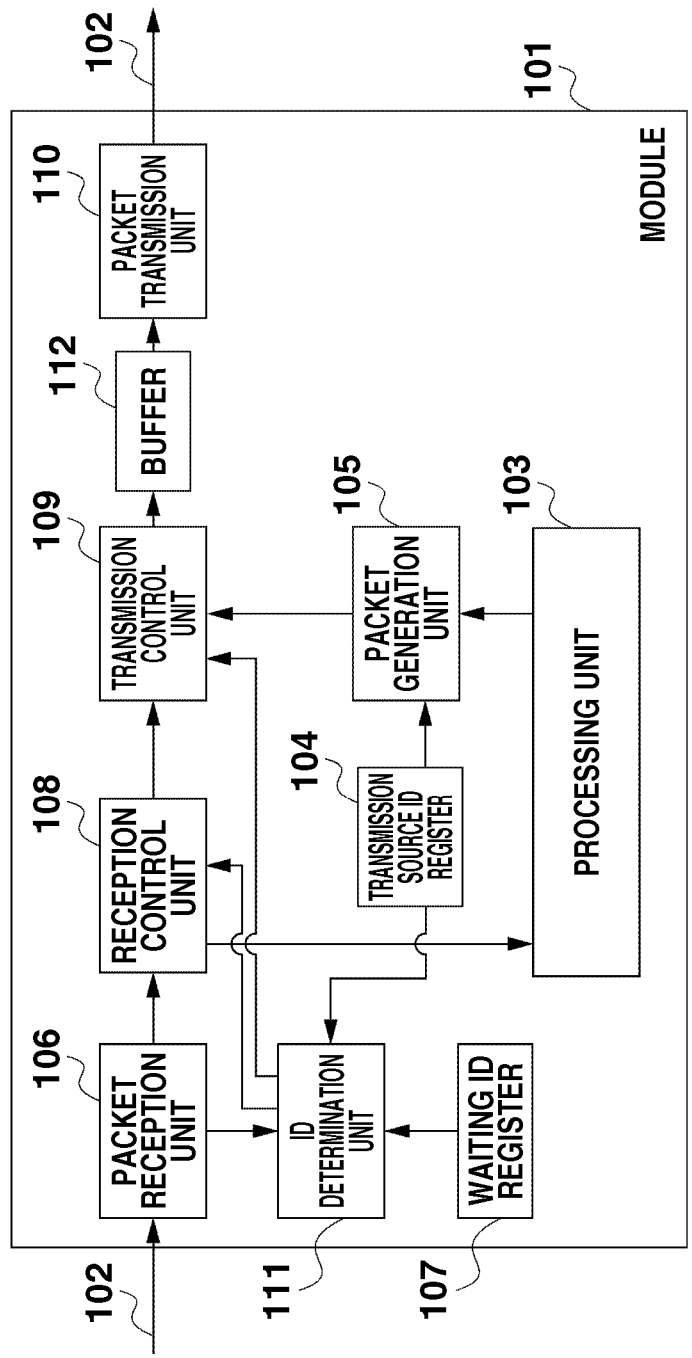
FIGS. 1A and 1B respectively illustrate a schematic configuration of one module and modules connected with each other in a ring shape.
Figure 1B:
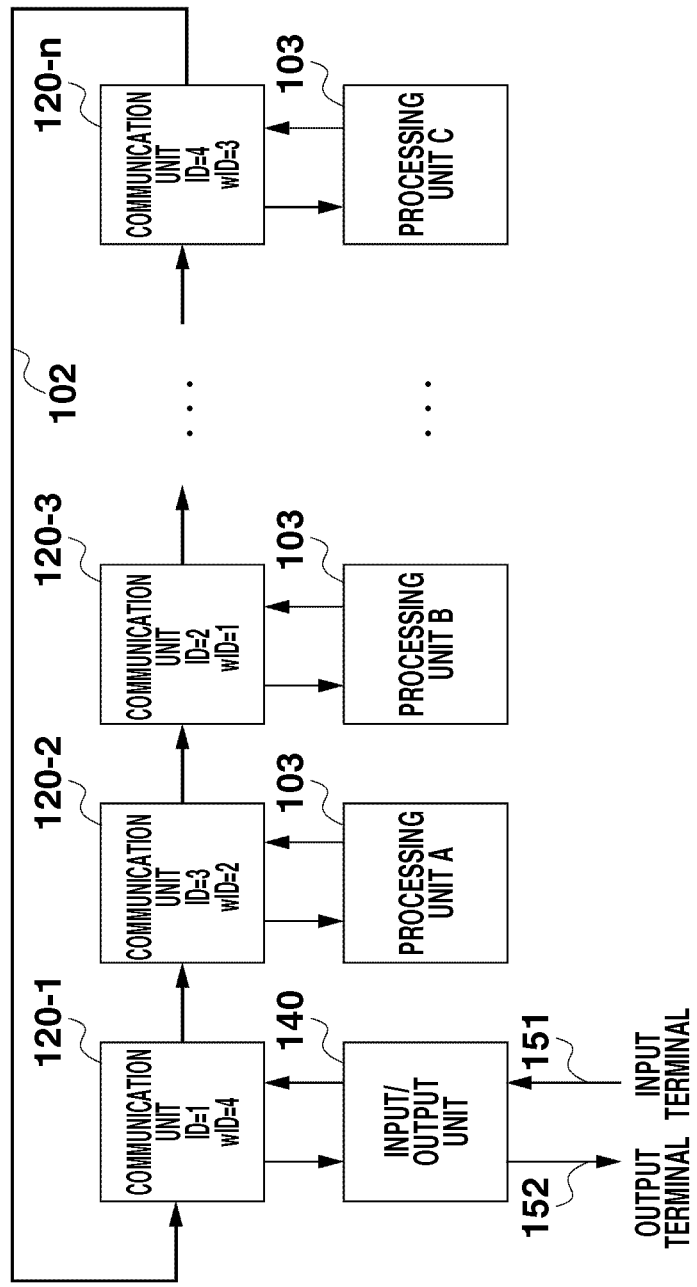

With reference to FIGS. 1A and 1B, a schematic operation performed by a processing module included in a data processing apparatus according to an exemplary embodiment of the present invention will be described. Arrows in the drawings indicate a direction in which a signal is transmitted. Blocks connected by the arrows represent that blocks are connected with each other by signal lines to transmit the signal in the arrow direction.

FIG. 1A illustrates a structure of one of modules communicably connected with each other in a ring shape. A module 101 is connected in the ring shape to constitute a ring bus 102. A packet reception unit 106 receives a packet from an upstream module via the ring bus 102. An ID determination unit 111 determines a packet which is set to be processed by a processing unit 103 of own module based on an ID of a reception packet and a value (waiting ID) stored in a waiting ID register 107 (second storage unit).

When the ID determination unit 111 detects the packet set to be processed by the processing unit 103 and data stored in the packet can be processed by the own module, the reception control unit 108 transmits the data stored in the packet to the processing unit 103. In the case other than above, more specifically, when the ID determination unit 111 does not determine that the processing unit 103 would process the data, or when the processing unit 103 is processing other data, the ID determination unit 111 passes the packet to a transmission control unit 109.

The processing unit 103 performs predetermined data processing on the data from the reception control unit 108. A packet generation unit 105 stores in the packet the data processed by the processing unit 103 and a transmission source ID (identification information) stored in a transmission source ID register 104 (first storage unit).

The transmission control unit 109 (transmission unit) controls which of the packet generated by the packet generation unit 105 and the packet passed from the reception control unit 108 is transmitted to a buffer 112 (first buffer unit). The buffer 112 stores the packet. A packet transmission unit 110 transmits the packet stored in the buffer 112 to a downstream module at every cycle time.

The ID determination unit 111 generates control information used by the reception control unit 108 and the transmission control unit 109.

As illustrated in FIG. 1B, the processing module includes a communication unit 120 and the processing unit 103. The communication unit 120 of each processing module is connected with each other in the ring shape, and processes the data input from an input/output unit 140 while transferring the data in one direction. The communication unit 120 includes the transmission source ID register 104, the packet generation unit 105, the packet reception unit 106, the waiting ID register 107, the reception control unit 108, the transmission control unit 109, the packet transmission unit 110, the ID determination unit 111, and the buffer 112 as illustrated in FIG. 1A. The communication unit 120 connected with the input/output unit 140 is provided with the input/output unit 140 instead of the processing unit 103.

The data processing apparatus according to the present exemplary embodiment includes the modules 101 which are connected with each other in the ring shape to form a ring network topology and has no limitation of the number of the modules to be connected. The buffer 112 may have a capacity of two or more stages. In the present exemplary embodiment, the buffer has the two stages.

An output from the buffer becomes an input to a next module. One packet is transferred to the next module in one cycle. When the apparatus includes the "N" number of modules, 2N pieces of data can be simultaneously present in the ring bus. However, the present invention does not limit all the modules to include the buffer having two or more stages.

Each module transfers one packet to the next module every cycle to perform data transfer in parallel. The waiting ID register 107 and the transmission source ID register 104 are appropriately set to cause the plurality of processing modules to process one piece of data in a desired order.

Figure 7:
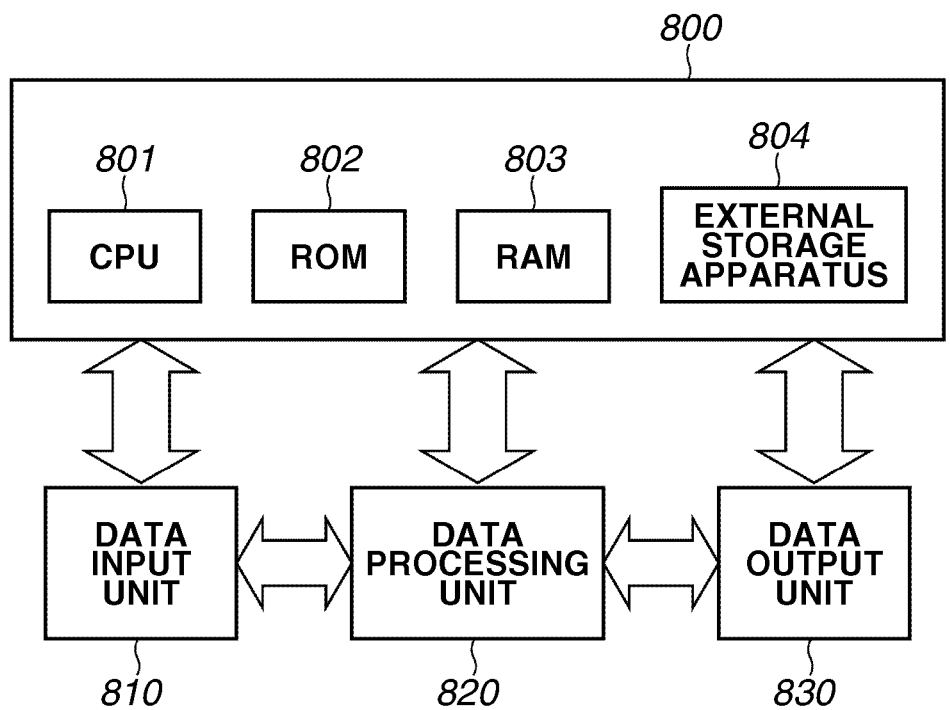
FIG. 7 illustrates a schematic configuration of a data processing apparatus.

FIG. 7 illustrates a schematic configuration of the data processing apparatus according to the present exemplary embodiment. A data processing unit 820 includes processing modules connected with each other in the ring shape. A system control unit 800 includes a central processing unit (CPU) 801 for calculation and control, a read only memory (ROM) 802 for storing fixed data or programs, a random access memory (RAM) 803 for temporally storing the data or for loading programs, and an external storage apparatus 804 for storing external data. A data input unit 810 takes the data to be processed in from an outside of a system. A data output unit 830 outputs the data processed by the system to the outside thereof.

The data processing unit 820 is set to perform data processing under control by the system control unit 800. The data processing unit 820 is supplied various types of data to be processed, processes the supplied data according to the settings, and outputs the processed data to the system control unit 800 and the data output unit 830.

The system control unit 800 sets the waiting ID and the transmission source ID for each register included in the module in the data processing unit 820 so that the plurality of modules included in the data processing unit 820 can perform processing on the input data in a desired order. Accordingly, a series of processing such as the pipeline processing can be performed by the plurality of the modules in parallel.

For example, if the system control unit 800 sets the waiting ID (denoted as "wID") and the transmission source ID (denoted as "ID") as illustrated in FIG. 1B, the pipeline processing can be performed in an order of a processing unit B, a processing unit A, and a processing unit C. For example, in FIG. 1B, a communication unit 120-1 is set to [wID:4, ID:1]. Similarly, other communication units are set as follows. A communication unit 120-2 is set to [wID:2, ID:3], a communication unit 120-3 is set to [wID:1, ID:2], and a communication unit 120-n is set to [wID:3, ID:4].

The system control unit 800 stores a scenario for every processing in the external storage apparatus 804, the ROM 802, or the RAM 803. The scenario can be used to identify which processing module of the data processing unit 820 is processed in what number of order when the system control unit causes the data processing unit 820 to perform a series of the processing according to instructions by a user or an application. The system control unit 800 interprets the order in which the processing module performs the processing based on the scenario, determines the transmission source ID of each module according to the order, and then determines the waiting ID of each module based on the determined transmission source ID and the scenario.

Simply, setting values (transmission source ID and waiting ID) of each module according to the processing order may be stored in advance in the system control unit 800 as a table for every series of the processing (pipeline processing).

As described above, the values of the transmission source ID register 104 and the waiting ID register 107 are set in such a manner that each module transmits and receives the packet in an order corresponding to predetermined data processing.

According to the present exemplary embodiment, the system control unit 800 sets a larger value of the transmission source ID at a latter stage of the pipeline processing so that each module can identify the priority of the packet (data). Thus, the packet having the lager value of the transmission source ID can be transmitted. This is because, in order to improve processing efficiency of the entire data processing apparatus, the data which has been processed in the latter stage of a phase in the processing order is to be transferred.

Figure 2A:
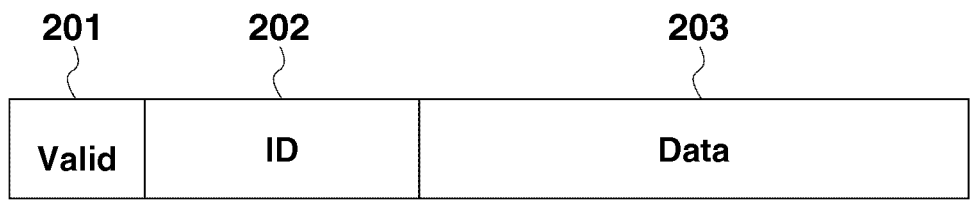
FIGS. 2A, 2B, and 2C illustrate data structures of a packet and transmission source IDs.

FIG. 2A illustrates a format of a packet to be used for data transfer between the modules in the data processing apparatus including the module illustrated in FIG. 1. A field 201 is a valid flag ("1" indicates valid and "0" indicates invalid) indicating whether the packet is valid. A field 202 is an identifier of the module storing the data in the packet. The field 202 stores the transmission source ID that also indicates the priority of the data stored in the packet. A field 203 stores the data.

The transmission source ID of the field 202 is assigned a value for enabling identification of order relationships of the modules to be used and for determining the priority of the data stored in each packet.

Figure 2B:
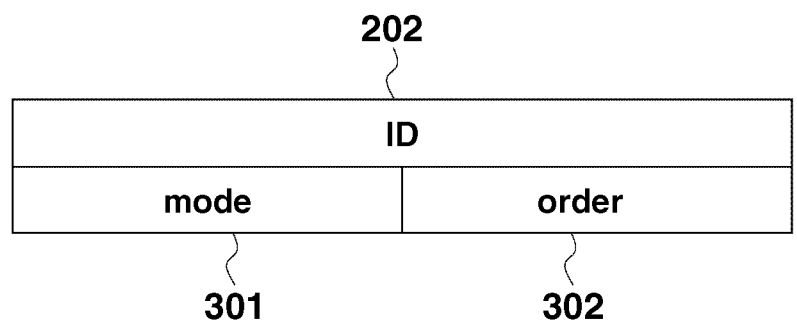

With reference to FIG. 2B, the transmission source ID stored in the field 202 will be described in detail. An order 302 is a transmission source ID unique to each module which is stored together when the data from the input/output unit 140 or the processing unit 103 is stored into the packet by the packet generation unit. A mode 301 is a field to be set when the data is to be processed at a high priority regardless of the transmission source ID with respect to the packet of the module including the processing unit which may be a bottleneck of processing performance among the modules to be used. For example, when the priority is normal, "0" is stored, and when the priority is high, "1" is stored.

Figure 2C:
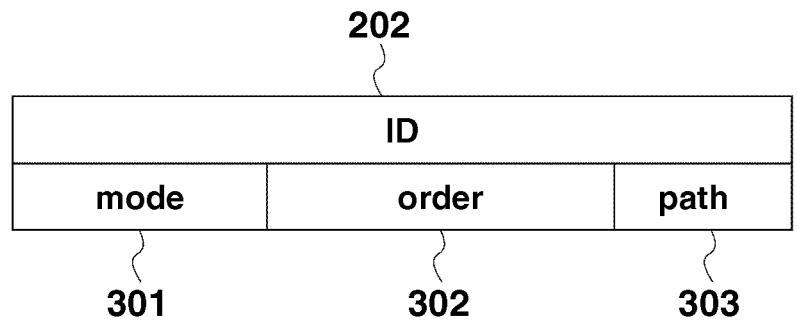

When the data processing apparatus performs a plurality of types of a series of the data processing (for example, a plurality of the pipeline processings) in parallel, an identifier for identifying a path of each series of the data processing is stored as a path 303 as illustrated in FIG. 2C. The configuration of the packet illustrated in FIGS. 2A to 2C is merely an example, and does not limit an arrangement of fields. Further, a transmission source ID 202 may include any value as long as the order relationship between the transmission source module of the packet and the module to be used for processing can be identified. The mode 301 may be omitted.

Next, an operation for transferring the packet will be described in detail. The operation will be described in which the data processed by the processed unit is transmitted to the next module in which the data to be processed by the packet illustrated in FIGS. 2A to 2C. The packet generation unit 105 stores the data processed by the processing unit 103 in the field 203, a value of the transmission source ID register 104 in the field 202, and sets the valid flag in the field 201 to valid.

A plurality of the communication units 120 can perform the processing for transferring the packets by the modules in parallel. On the other hand, the transmission control unit 109 is to determine which packet of the packet passing the module or the packet storing the data processed by the processing unit 103 in the module is prioritized.

Figure 3A:
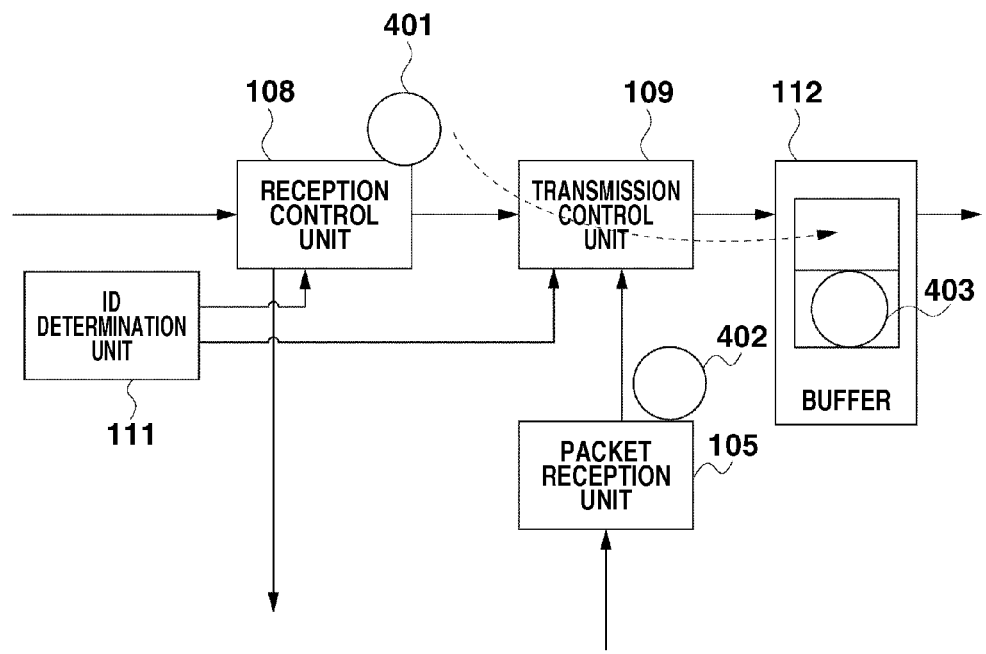
FIGS. 3A and 3B illustrate an operation for changing packets.
Figure 3B:
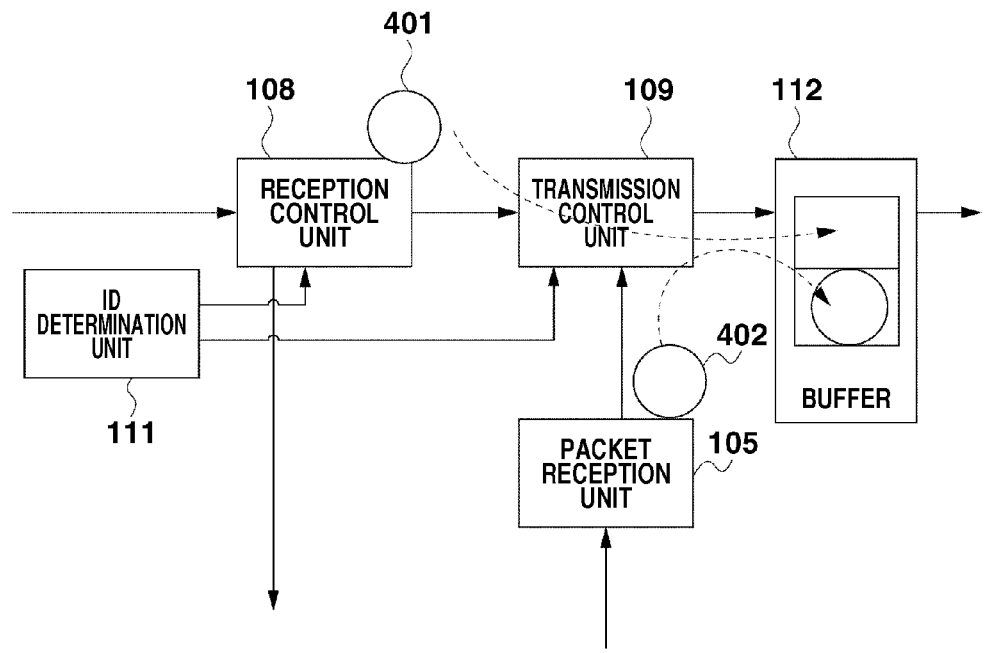

With reference to FIGS. 3A and 3B, the processing performed by the transmission control unit 109 will be described in detail. A packet 401 is received by the reception control unit 108 (corresponds to the packet reception unit 106). A packet 402 is generated by the packet generation unit 105. A packet 403 is left inside the buffer 112 during a previous cycle.

If the valid flag of the received packet 401 indicates invalid ("0" is stored in the field 201), the packet 401 is an empty packet, so that the reception control unit 108 outputs the packet 402 to the buffer 112. When the valid flag is invalid, the packet 401 is overwritten with the packet 402. Instead of overwriting, the packet generation unit 105 may operate the value of each field in the packet 401 to store the data in the packet 401.

On the other hand, if the valid flag is valid ("1" is stored in the field 201), the transmission control unit 109 performs transmission control based on each priority (order 302) of the packet 401 and the packet 402 and an available capacity of the buffer 112. A signal line (not illustrated) is connected from the buffer 112 to the transmission control unit 109, so that the buffer 112 notifies the transmission control unit 109 of the available capacity using the signal line.

To transfer one packet to a next module every one cycle, basically one available capacity is used in the buffer 112. According to the present exemplary embodiment, as illustrated in FIG. 3A, when only one capacity is available, the packet 401 in which the valid flag is valid is transferred prior to the packet 402. Further, as illustrated FIG. 3B, when two or more capacities are available in the buffer, an output to the buffer 112 is controlled in such a manner that the packet having the higher priority is transmitted in a next cycle based on a determination result obtained by the ID determination unit 111.

When the priority of the packet (corresponding to the packet 401) received by the packet reception unit 106 is compared with the priority of the packet (corresponding to the packet 402) generated by the packet generation unit 105, the ID determination unit 111 performs a simple calculation on the transmission source ID 202 of each packet. According to the present exemplary embodiment, sizes of the transmission source IDs 202 of the packets may be simply compared to determine the priority. Further, the transmission source ID 202 of the packet of the packet reception unit 106 may be weighed larger than the transmission source ID 202 of the packet of the packet generation unit 105. Then the sizes of the transmission source IDs 202 may be compared with each other to determine the priority.

Since the transmission source ID of the packet 402 corresponds to a value stored by the transmission source ID register 104, the ID determination unit 111 may compare the value of the transmission source ID register 104 with the transmission source ID of the packet received by the packet reception unit 106, and notify the transmission control unit 109 of the result.

As a method that the transmission control unit 109 learns whether the valid flag of the packet 401 is valid, the transmission control unit 109 may directly check the valid flag of the packet or the ID determination unit 111 may notify the transmission control unit 109 of the value.

Next, an operation for receiving the packet will be described. The ID determination unit 111 of the present exemplary embodiment performs determination according to whether the packet received by the packet reception unit 106 stores the data to be processed by the processing unit 103 of own module 103 or comparison of the transmission source ID stored in the received packet with the value of the waiting ID register 107. For example, the ID determination unit 111 may perform the determination when the values of the IDs match each other. When the values of the IDs match each other, the reception control unit 108 outputs to the processing unit 103 the data stored in the packet whose ID is determined to match the value of the waiting ID register 107 by the ID determination unit 111. When the values of the IDs do not match each other, the reception control unit 108 passes the data through to the transmission control unit 109.

As described above, according to the present exemplary embodiment, the number of cycles until a series of the data processing is completed can be reduced and processing efficiency can be improved in the entire data processing apparatus. Further, packet transfer according to the order for performing the predetermined data processing and packet transfer considering the priority of the data can be realized by a single transmission source ID. Since two types of the packet transfer can be realized by the single transmission ID, each module can readily determine at a time whether to take the received packet in and which of the packet storing the processed data and the packet passing through the module is transmitted. Accordingly, a determination mechanism can be simplified. Since the packet does not need to have the priority of the data separately from the ID thereof, the number of bits of the packet can be reduced. Further, since a storage unit for associating the ID with the priority and a wiring for collective management do not need to be arranged in each module, a size of a circuit of the module can be reduced.

According to the present exemplary embodiment, the system control unit 800 sets a larger value for the transmission source ID register of the processing unit at the latter stage of the pipeline processing, and the ID determination unit 111 determines to give the priority to the packet including the order 302 having a larger value. However, the present invention is not limited thereto. The system control unit 800 may set a smaller value of the transmission source ID register for the processing unit at the latter stage of the pipeline processing and the ID determination unit 111 may determine to give the priority to the packet including the order 302 having a smaller value. Thus, similar effects can be obtained. Further, a field corresponding to the ID of the packet may be provided at a plurality of positions in the packet to give the higher priority to the ID having the higher or the lower bit.

If a plurality of packets including different values as the paths 303 (multiple path) illustrated in FIG. 2C is used, the pipeline processing can be executed a plurality of times corresponding to the number of packets. In that case, the waiting ID register 107 is to associate the waiting ID with a value of each path 303 and store as many waiting IDs as the number of times to execute the pipeline processing. Further, the transmission source ID register 104 is to associate the transmission source ID with a value of each path 303 and store as many transmission source IDs as the number of times to execute the pipeline processing.

For example, when the plurality of processing modules include the packet to be processed by pipeline processing "1" [FIG. 1B: in the order of B, A, and C] and the packet to be processed by pipeline processing "2" [in the order of C, B, and A] in a mixture, a plurality of methods for assigning the priority are considered.

One of the methods is for equally dealing with packets in the same phase in the pipeline processing "1" and the pipeline processing "2" which includes three phases each. Another method is for giving the priority to either one of the pipeline processing "1" or the pipeline processing "2" than the other.

For example, when the data processed by the pipeline processing "1" is written into the RAM 803 and the data is used as the data to be processed by the pipeline processing "2", if a region of the RAM 803 is to be saved, the packet processed by the pipeline processing "2" may be transmitted.

When the pipeline processing "2" is prioritized than the pipeline processing "1", the system control unit assigns the transmission source ID to each module so that the pipeline processing "2" is performed at the stage latter than the pipeline processing "1". In examples of the above-described orders, each connection ID is set as follows. The communication unit 120-1 is set to [path 1 ID: 1, path 2 ID: 5]. Similarly, other communication units are also set. A communication unit 120-2 is set to [path 1 ID: 3, path 2 ID: 8], a communication unit 120-3 is set to [path 1 ID: 2, path 2 ID: 7], and a communication unit 120-n is set to [path 1 ID: 4, path 2 ID: 6]. The waiting ID is omitted, however, the waiting ID that can process in the above-described processing order is to be assigned for every path.

Figure 4:
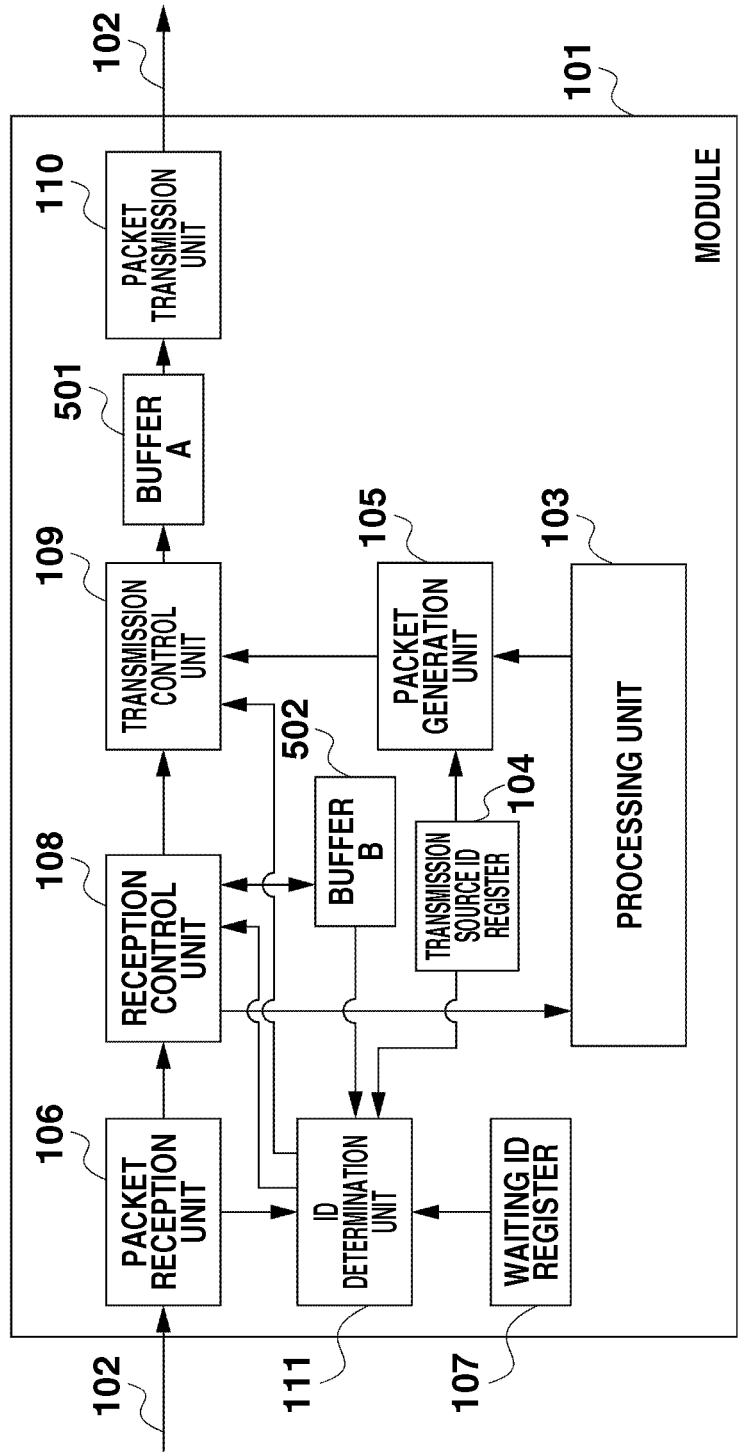
FIG. 4 is a block diagram illustrating a schematic configuration of a module.

A data processing apparatus according to a second exemplary embodiment will be described below with reference to FIG. 4. Same reference numerals are given to configurations and processes having same functions as in the first exemplary embodiment. Descriptions of parts having the same configurations or functions are not repeated.

According to the second exemplary embodiment, there are provided a buffer A 501 (first buffer unit) and a buffer B 502 (second buffer unit) which have capacity of at least one or more stages. The buffer B 502 temporarily stores the packet transmitted from the packet reception unit 106 and transmits the stored data to the buffer A 501 via the reception control unit 108 and the transmission control unit 109. The ID determination unit 111 compares the priority of the packet to be output from the buffer B 502 to the buffer A 501, the priority of the packet received by the buffer B 502 from the packet reception unit 106, and the priority of the packet to be output by the packet generation unit 105. Thus, the ID determination unit 111 can determine which packet is to be transmitted. A determined result is notified to the reception control unit 108 and the transmission control unit 109. Similar to the first exemplary embodiment, the ID determination unit 111 simply compares (compares sizes) the IDs of the plurality of target packets with each other to determine the priority.

With reference to FIGS. 5A, 5B, 6A, and 6B, an operation for transmitting the packet will be described. A packet 601 is transmitted from the reception control unit 108. A packet 602 is generated by the packet generation unit 105. A packet 603 is stored by the buffer B 502.

When the valid flag of at least one packet of these three packets is valid, the transmission control unit 109 performs control such that the packet whose valid flag is valid is transmitted to the buffer A 501.

On the other hand, when the valid flags of two or more packets are valid, the transmission control unit 109 performs the control based on a result determined by the ID determination unit 111. Determination of the priority by the ID determination unit 111 and an operation based on the determination when the valid flags of the two or more packets are valid, will be described as below.

When the packet 602 has the highest priority among the three packets, the ID determination unit 111 transmits control information to the transmission control unit 109 to transmit the packet 602 to the buffer A 501.

Even if the valid flag of the packet 601 is valid, when the buffer B 502 is available as illustrated in FIG. 5A, the reception control unit 108 transmits the packet 601 to the buffer B 502. However, when the buffer B 502 is not available as illustrated in FIG. 5B, the reception control unit 108 transmits the packet 601 to the buffer A 501.

Figure 6A:
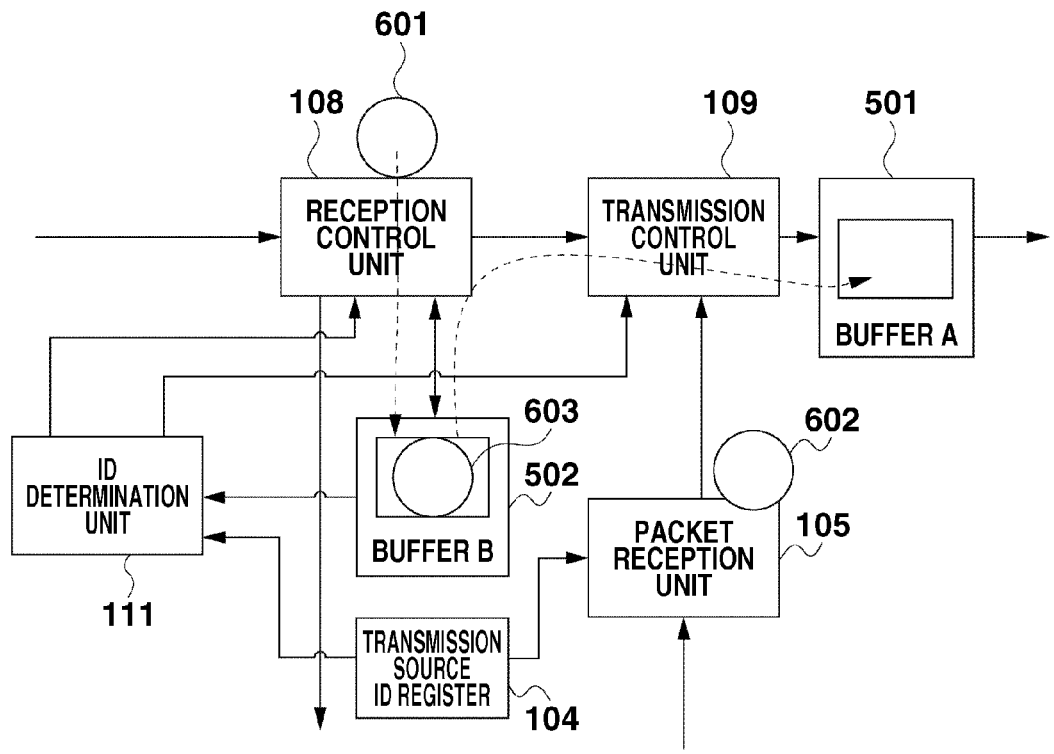
FIGS. 6A and 6B illustrate an operation for changing packets.

As illustrated in FIG. 6A, when the valid flag of the packet 601 is valid and the ID determination unit 111 determines that the packet 603 has the higher priority than the packets 601 and 602, the reception control unit 108 transmits the packet 603 to the buffer A 501. At this point, the reception control unit 108 transmits the packet 601 to the buffer 502.

Figure 6B:
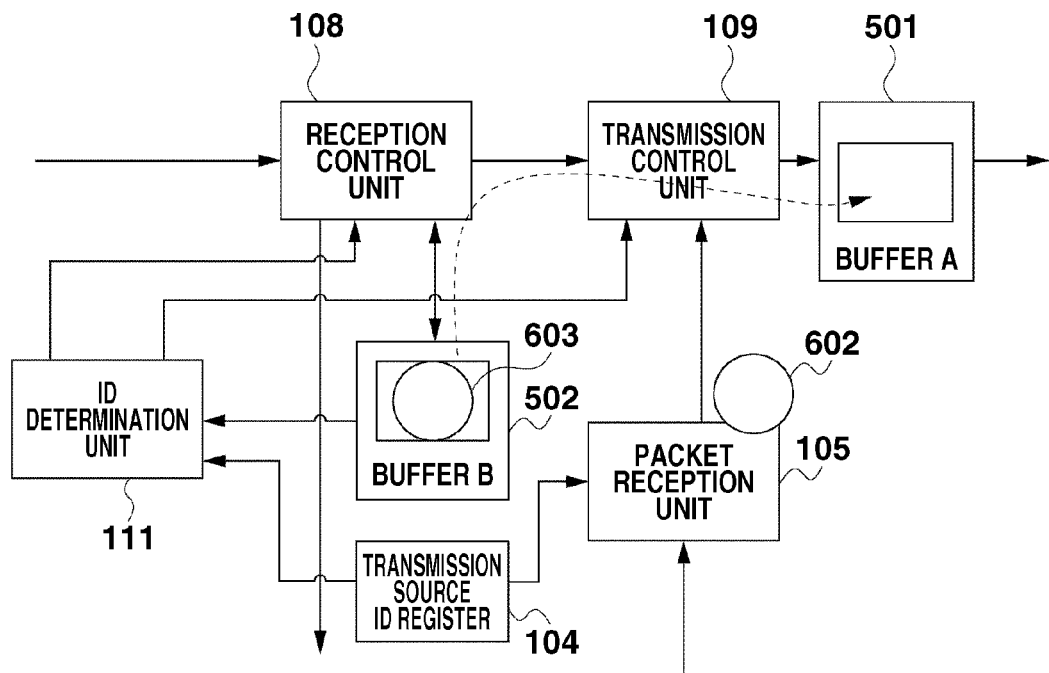

On the other hand, as illustrated in FIG. 6B, when the valid flag of the packet 601 is invalid, and the packet 602 has the lower priority than the packet 603, the packet 603 is output to the buffer A 501. On the contrary, when the packet 602 has the higher priority than the packet 603, the packet 602 is output to the buffer A 501.

However, the present exemplary embodiment describes just an example. The packet generation unit 105 and the buffer B 502 may be connected by the signal line. The packet 602 may be transmitted to the buffer B 502, and subsequently processed similarly to the buffer 603 as described above.

When the buffer B 502 is arranged to have "N" stages ("N" is a natural number of two or more), the ID determination unit 111 may compare the priority of the maximum "N" number of the packets 603 included in the buffer B 502, the priority of the packet 601 of the reception control unit 108, and the priority of the packet 602 of the packet generation unit 105 with one another. When the control is complicated, the buffer B 502 may be formed in a first-in first-out (FIFO) construction to compare the priority of the "M" numbers of the packets on an output side.

As described above, according to the second exemplary embodiment, based on a result of determining the priority of the data, the packet including the data with low priority is stored in the buffer in the module and used as comparison target again in a next cycle. Accordingly, packets whose priority is compared are increased compared to in the first exemplary embodiment. With this arrangement, since criteria for determining the priority are increased in each module, the determination for improving the efficiency for transferring the packet can be more finely performed.

In the exemplary embodiments described above, the configuration in which each processing module has the ring-shaped topology is described as an example. However, the present invention is not limited to the ring-shaped topology. For example, if each of the processing modules is connected each other in the form of bus topology or mesh topology, the present invention can be applied to any configuration in which a series of the processing (pipeline processing) is divided and performed in parallel by the plurality of modules in turn, and thus the transfer efficiency can be improved.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-153314, filed Jun. 29, 2009, which is hereby incorporated by reference herein in its entirety.

What is claimed is:

1. An apparatus having a plurality of modules connected with each other and processes a packet having identification information, a module comprising:
   a storage unit configured to store first identification information as a waiting ID and second identification information as a transmission ID;
   a reception unit configured to receive a first packet;
   a processing unit configured to process data included in the first packet, the first packet having the same identification information as the waiting ID stored in the storage unit;
   a generation unit configured to generate a second packet including the processed data and the transmission ID stored in the storage unit as identification information; and
   a transmission unit configured to transmit the packet, wherein the transmission unit transmits the packet having a latter processing order by comparing identification information included in the first packet received by the reception unit with identification information included in the second packet generated by the generation unit,
   wherein the transmission ID indicates an assigned value for enabling identification of order relationships of the plurality of modules.

2. The apparatus according to claim 1, further comprising a first buffer unit configured to temporarily buffer the second packet,
   wherein when the first buffer unit has a small available capacity, the transmission unit transmits the first packet.

3. The apparatus according to claim 1, further comprising a second buffer unit configured to temporarily buffer a third packet that is not transmitted.

4. The apparatus according to claim 3, wherein the transmission unit compares the identification information stored in the first packet, the identification information stored in the second packet, and information stored in the third packet to determine the packet which is in the latter of the order.

5. The apparatus according to claim 1, further comprising a control unit configured to set the identification information for the storage unit.

6. The apparatus according to claim 5, wherein the control unit sets a larger value to identification information of a module having the latter order and the transmission unit determines that the packet including the identification information having the larger value is the packet having the latter order.

7. The apparatus according to claim 5, wherein the control unit sets a smaller value to identification information of a module having the latter order and the transmission unit determines that the packet including the identification information having the smaller value is the packet having the latter order.

8. The apparatus according to claim 1, wherein the plurality of modules are connected with each other in a ring shape and the plurality of modules perform processing on the data while each module transmits the data in a single direction.

9. The apparatus according to claim 1, wherein the packet includes a valid flag indicating whether the stored data is valid, and when the valid flag of the first packet indicates valid, the transmission unit compares the identification information stored in the first packet with the identification information stored in the second packet to determine the packet which is in the latter of the order.

10. The apparatus according to claim 1,
    wherein the reception unit takes a packet including identification information which coincides with the waiting ID stored in the storage unit in the processing unit.

11. The apparatus according to claim 10, wherein the transmission unit transmits a packet including identification information which does not coincide with the waiting ID stored in the storage unit.

12. A method for processing data performed by an apparatus having a plurality of modules connected with each other and processes a packet having identification information, the method comprising:
    storing first identification information as a waiting ID and second identification information as a transmission ID;
    receiving a first packet and processing data included in the first packet, the first packet having the same identification information as the stored waiting ID
    generating a second packet for storing the processed data and the stored transmission ID as identification information; and
    transmitting the packet, wherein the transmitting transmits the packet having a latter processing order by comparing identification information included in the first packet received by the receiving with identification information included in the second packet generated by the generating,
    wherein the transmission ID indicates an assigned value for enabling identification of order relationships of the plurality of modules.

13. The method according to claim 12, further comprising temporarily buffering the second packet by a first buffer unit,
    wherein when the first buffer unit has a small available capacity, the transmitting transmits the first packet.

14. The method according to claim 12, further comprising temporarily buffering a third packet that is not transmitted by a second buffer unit.

15. The method according to claim 14, further comprising comparing the identification information stored in the first packet, the identification information stored in the second packet, and identification information stored in the third packet to determine the packet which is in the latter of the order.

16. The method according to claim 12, further comprising setting the identification information for the storage unit.

17. The method according to claim 16, further comprising setting a larger value to identification information of a module having the latter order and determining that the packet including the identification information having the larger value is the packet having the latter order.

18. The method according to claim 16, further comprising setting a smaller value to identification information of a module having the latter order and determining that the packet including the identification information having the smaller value is the packet having the latter order.

19. The method according to claim 12, wherein the plurality of modules are connected with each other in a ring shape and the plurality of modules perform processing on the data while each module transmits the data in a single direction.

20. The method according to claim 12, wherein the packet includes a valid flag indicating whether the stored data is valid, and when the valid flag of the first packet indicates valid, the transmitting compares the identification information stored in the first packet with the identification information stored in the second packet to determine the packet which is in the latter of the order.

21. A non-transitory computer-readable storage medium that stores a program for controlling an apparatus having a plurality of modules connected with each other and processes data, the program executes steps of:
    storing first identification information as a waiting ID and second identification information as a transmission ID;
    receiving a first packet and processing data included in a packet, the first packet having the same identification information as the stored waiting ID; and
    generating a second packet for storing the processed data and the stored transmission ID as identification information; and
    transmitting the packet, wherein the transmitting transmits the packet having a latter processing order by comparing identification information included in the first packet received by the receiving with identification information included in the second packet generated by the generating,
    wherein the transmission ID indicates an assigned value for enabling identification of order relationships of the plurality of modules.

22. The non-transitory computer-readable storage medium according to claim 21, further comprising temporarily buffering the second packet by a first buffer unit,
    wherein when the first buffer unit has a small available capacity, the transmitting transmits the first packet.

23. The non-transitory computer-readable storage medium according to claim 21, further comprising temporarily buffering a third packet that is not transmitted by a second buffer unit.

24. The non-transitory computer-readable storage medium according to claim 23, further comprising comparing the identification information stored in the first packet, the identification information stored in the second packet, and identification information stored in the third packet to determine the packet which is in the latter of the order.

25. The non-transitory computer-readable storage medium according to claim 21, further comprising setting the identification information.

26. The non-transitory computer-readable storage medium according to claim 25, further comprising setting a larger value to identification information of a module having the latter order and determining that the packet including the identification information having the larger value is the packet having the latter order.

27. The non-transitory computer-readable storage medium according to claim 25, further comprising setting a smaller value to identification information of a module having the latter order and determining that the packet including the identification information having the smaller value is the packet having the latter order.

28. The non-transitory computer-readable storage medium according to claim 21, wherein the plurality of modules are connected with each other in a ring shape and the plurality of modules perform processing on the data while each module transmits the data in a single direction.

29. The non-transitory computer-readable storage medium according to claim 21, wherein the packet includes a valid flag indicating whether the stored data is valid, and when the valid flag of the first packet indicates valid, the transmitting compares the identification information stored in the first packet with the identification information stored in the second packet to determine the packet which is in the latter of the order.

30. An apparatus having a plurality of modules connected with each other and processes a packet having identification information, a module comprising:
    a storage unit configured to store first identification information as a waiting ID and second identification information as a transmission ID;
    a reception unit configured to receive a packet;
    a processing unit configured to process data included in a packet, among packets received by the reception unit, having same identification information with the first identification information stored in the storage unit;
    a generation unit configured to generate a packet including the processed data and having the second identification information stored in the storage unit as identification information;
    a buffer unit configured to buffer a packet, among packets received by the reception unit, having identification information different from the first identification information stored in the storage unit; and
    a transmission unit configured to transmit a packet having a latter processing order by comparing the identification information included in the packet generated by the generation unit with the identification information included in the packet buffered by the buffer unit,
    wherein the transmission ID indicates an assigned value for enabling identification of order relationships of the plurality of modules.

31. The apparatus according to claim 30, further comprising a control unit configured to set the identification information for the storage unit.

32. The apparatus according to claim 31, wherein the control unit sets a larger value to identification information of a module having the latter order and the transmission unit determines that the packet including the identification information having the larger value is the packet having the latter order.

33. The apparatus according to claim 30, wherein the plurality of modules is connected with each other in a ring shape and the plurality of modules performs processing on the data while each module transmits the data in a single direction.

34. A method for an apparatus having a plurality of modules connected with each other and processes a packet having identification information comprising:
   storing first identification information as a waiting ID and second identification information as a transmission ID;
   receiving a packet;
   processing data included in a packet, among packets received by the receiving, having same identification information with the stored first identification information;
   generating a packet including the processed data and having the stored second identification information as identification information;
   buffering a packet, among packets received by the receiving, having identification information different from the stored first identification information; and
   transmitting a packet having a latter processing order by comparing the identification information included in the generated packet with the identification information included in the buffered packet,
   wherein the transmission ID indicates an assigned value for enabling identification of order relationships of the plurality of modules.

35. The method according to claim 34, further comprising setting the identification information for the storing.

36. The method according to claim 35, further comprising:
   setting a larger value to identification information of a module having the latter order; and
   determining that the packet including the identification information having the larger value is the packet having the latter order.

37. The method according to claim 34, wherein the plurality of modules is connected with each other in a ring shape and the plurality of modules performs processing on the data while each module transmits the data in a single direction.

38. A non-transitory computer-readable storage medium that stores a program for controlling an apparatus having a plurality of modules connected with each other and processes a packet having identification information comprising, the program executes steps of:
   storing first identification information as a waiting ID and second identification information as a transmission ID;
   receiving a packet;
   processing data included in a packet, among packets received by the receiving, having same identification information with the stored first identification information;
   generating a packet including the processed data and having the stored second identification information as identification information;
   buffering a packet, among packets received by the receiving, having identification information different from the stored first identification information; and
   transmitting a packet having a latter processing order by comparing the identification information included in the generated packet with the identification information included in the buffered packet,
   wherein the transmission ID indicates an assigned value for enabling identification of order relationships of the plurality of modules.

39. The non-transitory computer-readable storage medium according to claim 38, further comprising setting the identification information for the storing.

40. The non-transitory computer-readable storage medium according to claim 39, further comprising:
   setting a larger value to identification information of a module having the latter order; and
   determining that the packet including the identification information having the larger value is the packet having the latter order.

41. The non-transitory computer-readable storage medium according to claim 38, wherein the plurality of modules is connected with each other in a ring shape and the plurality of modules performs processing on the data while each module transmits the data in a single direction.

* * * * *